United States Patent
Kordesch et al.

(10) Patent No.: US 7,014,944 B2
(45) Date of Patent: Mar. 21, 2006

(54) ELECTRODES FOR ALKALINE FUEL CELLS WITH CIRCULATING ELECTROLYTE

(75) Inventors: Karl Kordesch, Graz (AT); Martin Cifrain, Graz (AT)

(73) Assignee: Apollo Energy Systems, Incorporated, Fort Lauderdale, FL (US)

( * ) Notice: Subject to any disclaimer, the term of this patent is extended or adjusted under 35 U.S.C. 154(b) by 108 days.

(21) Appl. No.: 10/350,322

(22) Filed: Jan. 24, 2003

(65) Prior Publication Data

US 2003/0190519 A1  Oct. 9, 2003

Related U.S. Application Data

(63) Continuation of application No. PCT/US01/41388, filed on Jul. 25, 2001.

(60) Provisional application No. 60/220,655, filed on Jul. 25, 2000.

(51) Int. Cl.
 *H01M 4/86* (2006.01)
(52) U.S. Cl. .............................. 429/44; 429/42; 429/40
(58) Field of Classification Search .................. 429/44, 429/42, 46, 13, 40
See application file for complete search history.

(56) References Cited

U.S. PATENT DOCUMENTS

| | | | |
|---|---|---|---|
| 4,179,359 A | 12/1979 | Hayes et al. | |
| 4,447,505 A | 5/1984 | Blanchart | |
| 6,106,965 A | * 8/2000 | Hirano et al. | ................. 429/44 |
| 6,238,534 B1 | 5/2001 | Mao et al. | |

FOREIGN PATENT DOCUMENTS

| | | | |
|---|---|---|---|
| EP | 0 791 974 A1 | * | 8/1997 |
| JP | 9-161809 | | 6/1997 |

* cited by examiner

*Primary Examiner*—Laura Weiner
(74) *Attorney, Agent, or Firm*—Pillsbury Winthrop Shaw Pittman LLP

(57) ABSTRACT

Fuel cell electrodes are described which comprise a non-woven network of conductive fibers, such as a carbon fleece, nickel foam sheet or stainless steel wool layer, plus additional activated carbon material, carrying one or more catalyst components and at least one polymeric substance as binder and/or repellancy agent to establish three zone interfaces (liquid-solid-liquid) or three phase interfaces (gas-liquid-solid). The electroactive catalyzed material is embedded into the conductive structure by specified deposition processes, such as coating, blading or spraying.

10 Claims, 3 Drawing Sheets

ELECTRODES FOR ALKALINE FUEL CELLS WITH CIRCULATING ELECTROLYTE

This is a Continuation of International Application No. PCT/US01/41388, which was filed on Jul. 25, 2001, and claims the benefit of U.S. Provisional Application No. 60/220,655, which was filed on Jul. 25, 2000, the contents of both of which are incorporated by reference in their entirety.

BACKGROUND OF THE INVENTION

1. Field of the Invention

The present invention relates to novel electrode structures which are of use in electrochemical devices, particularly fuel cells, and it teaches new processes for the manufacture of electrode and stack designs. The invention improves also alkaline direct methanol fuel cells.

2. Description of Related Art

Electrochemical cells invariably comprise at their fundamental level a solid or liquid electrolyte and two electrodes, the anode and cathode, at which the desired electrochemical reactions take place. Porous electrodes are employed in a range of electrochemical devices, in which a gaseous or liquid reactant and/or product has to be transferred into or out of one of the cell electrode structures. They are designed to optimise the contact between the reactant and the electrolyte to maximise the reaction rate. Catalysts are often incorporated into electrode structures to increase the rates of the desired electrode reactions.

Porous metal or carbon electrodes are employed in many different electrochemical devices, including metal-air batteries, electrochemical gas sensors, electrosynthesis of useful chemical compounds, and in particular, fuel cells.

A fuel cell is an energy conversion device that efficiently converts the stored chemical energy of its fuel into electrical energy by combining either hydrogen, stored as a gas, or methanol stored as a liquid or gas, with oxygen to generate electrical power. The hydrogen or methanol are oxidised at the anode and oxygen (or air) is reduced at the cathode. Both electrodes are of the porous type. The electrolyte has to be in contact with both electrodes and may be acidic or alkaline, liquid, solid or a membrane. The electrodes are designed to be porous and allow the reactant hydrogen or methanol to enter the electrode from the face of the electrode exposed to the reactant fuel supply, and diffuse through the thickness of the electrode to the reaction sites which contain catalysts, usually platinum metal based, to maximise the electrochemical oxidation of hydrogen or methanol. The anode is designed to be surface-wetted by the electrolyte to contact the same reaction sites. With alkaline electrolyte types the product of the hydrogen reaction is water. The water transpires through the porous electrode into the gas space behind the anode. The cathode is also designed to be porous and allow oxygen or air to enter the electrode and diffuse through to the reaction sites. Catalysts are again commonly incorporated to maximise the rate of the oxygen reaction (peroxide-mechanism) at the cathode reaction sites. The reaction of the methanol on the anode produces carbon dioxide, which forms carbonate with the caustic electrolyte. When methanol is exhausted, the electrolyte is exchanged. When the cell is re-fueled, a mix of methanol and caustic must be used. This is only possible with an exchangeable or circulating electrolyte system.

The porous electrodes of Fuel Cells comprise many components and are typically made up of one or more layers. Typically the porous electrode will comprise one or more catalyst containing layers, which are supported onto a more rigid porous substrate layer. The catalyst containing layers enhance the desired electrode reactions and comprise a catalyst, which may be formed on a high surface carbon material. Catalysts are often precious metals, particularly platinum alloys in a very high surface area form, dispersed and supported on a high surface area electrically conducting porous carbon, black or graphite (for example U.S. Pat. No. 4,447,505). The catalyst component may also be a non precious metal, such as one of the transition metals. In fuel cells which employ alkaline electrolytes, the cathode can comprise catalysts based on macrocyclic compounds of cobalt (U.S. Pat. No. 4,179,359). The catalyst layers may also comprise the high surface area carbon (steam- or $CO_2$ activated) itself, with no additional metal catalysts. The catalyst layers also comprise other non-catalytic components in addition to the catalyst material, usually polymeric materials which act as binders to hold the electrode layer together and may also perform an additional function in balancing the optimal hydrophobic or hydrophilic nature of the final structure.

These catalyst layers are usually formed into suitable mixtures of the components and deposited onto a suitable porous substrate, for example conducting carbon materials such as semi graphitised papers, cloths or foams, or particularly in the case of alkaline electrolyte systems, metal meshes such as nickel or stainless steel. These materials generally have a high bulk fibre density of greater than 0.4 $g/cm^3$. The primary role of the substrate is to act as a physical support for the catalyst containing layers and to provide an electrically conducting structure. It also enables a mechanically stable electrode to be produced.

A major problem with conventional electrodes based on semi-solid porous carbon substrates is the lack of flexibility. The conventional electrodes are consequently easily damaged on handling which leads to high reject rates during manufactoring of the electrode. This obviously has an impact on cost. With conventional porous electrodes based on woven cloth substrates a problem concerns the lack of good dimensional stability, as the cloth can easily be stretched in the directions of the major planar faces (x and y directions). This can make the manufacturing of electrodes using these substrates very difficult and therefore costly.

The complexity of the new types of Polymer-Electrolyte Membrane (PEM) electrodes which operate in an acidic pH-range requires a number of expensive components and also accessories (like a compressor on the air side) which results in high costs. The cost per unit of these electrodes is far higher than is currently acceptable to make applications in power generation devices, such as fuel cells, commercially viable.

SUMMARY OF THE INVENTION

It is therefore an object of the present invention to provide porous electrodes with increased dimensional stability and flexibility, high power output and lower cost. The electrodes shall also be usable in direct methanol fuel cells. A further object of the present invention is to provide an improved manufacturing process that is capable of delivering large numbers of electrodes for bipolar stacks at low cost, in high volumes and with high yields. Accordingly, the present invention provides electrodes which comprise a non-woven network of conductive fibres (like in a carbon fleece, nickel foam sheet or stainless steelwool layer), plus additional activated carbon material, carrying one or more catalyst components and at least one polymeric substance as binder and/or repellancy agent to establish three zone interfaces (liquid-solid-liquid) or three phase interfaces (gas-liquid-solid), whereby the electroactive catalysed material is embedded into the conductive structure by specified deposition processes (coating, blading or spraying).

A preferred embodiment of the invention is a fuel cell electrode comprising: a non-woven network of conductive fibers, electroactive carbon material carrying one or more catalysts, and at least one polymeric substance selected from the group consisting of a binder and a repellancy agent to establish liquid-solid-liquid zone interfaces or gas-liquid-solid phase interfaces, whereby structure of the electrode is formed upon embedding electroactive carbon material into the network of conductive fibers by a deposition process selected from the group consisting of coating, blading and spraying, and whereby specific catalyst density of the electrode is within the range of 0.8 mg/cm$^3$ to 50 mg/cm$^3$ (per vol.) or 0.1 mg/cm$^2$ to 2.0 mg/cm$^2$ (per area) and overall density of the electrode is within the range of 50 mg/cm$^2$ to 150 mg/cm$^2$ (per area). The catalyzed electroactive carbon material may be treated with one or more polymeric binders, the polymeric binders being selected to provide a suitable hydrophobic/hydrophilic balance to the electrode, creating an optimum ionic conduction pathway in the electrode. Preferably, the polymeric binders are selected from the group consisting of polytetrafluoroethylene, fluorinated ethylene-propylene copolymers, polyethylene, polypropylene, ethylene-propylene copolymers, polyisobutenes, polysulfones and epoxy resins.

In another preferred embodiment, the electroactive carbon material is steam-activated or $CO_2$-activated Vulcan XC-72, or a mix with carbon black or graphite, and the one or more catalysts are selected a) from one or more noble metal catalysts in the range of 0.1–1.2 mg/cm$^2$ for anodes; and b) from the group consisting of a noble metal catalyst in the range of 0.1–1.2 mg/cm$^2$, a non-noble metal catalyst, and mixtures thereof for oxygen or air cathodes, wherein the non-noble metal catalyst is selected from the group consisting of spinels, perovskites and Co-porphyrines. The electroactive carbon material is preferably steam-activated or $CO_2$ activated acetylene carbon black, and 0.2 to 3.0 mass % of a spinel $AB_2O_4$ is added to the carbon material to hasten carbon activation and to further stabilize the catalyst, wherein A=Mn, Co, Ni, Cu, or Cd, and B=Al, V, Cr, Ti.

In yet another preferred embodiment, the electrode is manufactured by filling a conductive metal fibre or carbon fleece structure with the electroactive carbon material by a) doctor blading of a highly viscous mixture achieved by adding the catalyst-containing electroactive carbon material to a suspension of polymer binder or adding the electroactive carbon material without a catalyst to a suspension of polymer binder and post-catalyzing the electrode;

b) spraying a low viscosity mixture; and c) rolling, pressing, or rolling and pressing the electrodes to a predetermined electrode thickness, at a predetermined temperature.

In still another preferred embodiment, the conductive fibers of the fuel cell electrode are selected from the group consisting of a carbon fleece, nickel and stainless steel. Preferably, the nickel conductive fibers comprise a nickel foam sheet and the stainless steel conductive fibers comprise stainless steel wool. Preferably, the non-woven network of nickel or stainless steel conductive fibres is partly coated by at least one polymeric substance selected from the group consisting of polytetrafluoroethylene, fluorinated ethylene-propylene copolymers, polyethylene, polypropylene, ethylene-propylene copolymers and polyisobutenes, thereby conferring hydrophobicity to the nickel or stainless steel while still supporting electrical surface conductivity.

In yet another preferred embodiment, multiple electrodes comprise stacks of various lengths adjusted to provide a predetermined voltage, wherein individual cells comprise either edge-collecting terminals or bipolar plates forming bipolar assemblies. Preferably, fuel cell electrodes comprising cells having edge collecting terminals further comprise fuel channels and oxygen manifolds arranged in pairs. Preferably, fuel cell electrodes comprising cells having bipolar assemblies comprise bipolar plates formed from molded conductive plastic or corrugated metal plates.

Another preferred embodiment is a method of using an inventive fuel cell electrode comprising operating the fuel cell electrode in an alkaline circulating electrolyte, wherein the alkaline circulating electrolyte comprises a KOH solution, ranging from 7N to 12N. The alkaline circulating electrolyte may be mixed with NaOH, thereby controlling repellency and adjusting $CO_2$-sensitivity. Preferably, the method further comprises operating the fuel cell electrode at temperatures between −10 and +80° C., and automatically adjusting electrolyte concentration in relation to temperature and current density in temperature ranges from 50° C. to 80° C. Also preferred is a method further comprising circulating an electrolyte for heat and water management in alkaline direct methanol fuel cells.

In yet another preferred embodiment, the method, further comprises distilling to reclaim at least a portion of waste methanol from the circulating electrolyte.

In still another preferred embodiment, the method, further comprises operating the fuel cell with hydrogen as fuel and oxygen or air as an oxidant or with methanol as fuel and oxygen or air as an oxidant. The method preferably further comprises operating the fuel cell with hydrogen as fuel by combining substantially repellant hydrogen anodes and substantially repellant oxygen or air cathodes with at least one of noble metals or non-noble metals, or mixes thereof. Preferably, the method comprising operating the fuel cell with methanol as fuel by combining substantially low-repellancy catalyzed anodes and cathodes with non-noble catalysts, thereby preventing chemical short circuit reactions due to methanol cross-leakage. The catalyzed anodes may comprise Pt—Ru catalyzed anodes. The method may further comprise producing $CO_2$ as a reaction product and converting the electrolyte to carbonate using the $CO_2$, and refueling the fuel cell with a mixture of methanol and alkaline circulating electrolyte solution in a ratio of about 1:1 by volume.

In yet another preferred embodiment comprises a method of using the inventive fuel cell electrode comprising covering an air cathode with a separator. Preferably, the separator comprises an asbestos layer.

Still another preferred embodiment comprises a method of using the inventive fuel cell electrodes further comprising running the fuel cell electrodes in cells operating in at least one of a continuous operation mode and an intermediate operation mode. Preferably, the cells are operated in an intermediate operation mode.

DETAILED DESCRIPTION OF THE PREFERRED EMBODIMENTS

Figure 1:
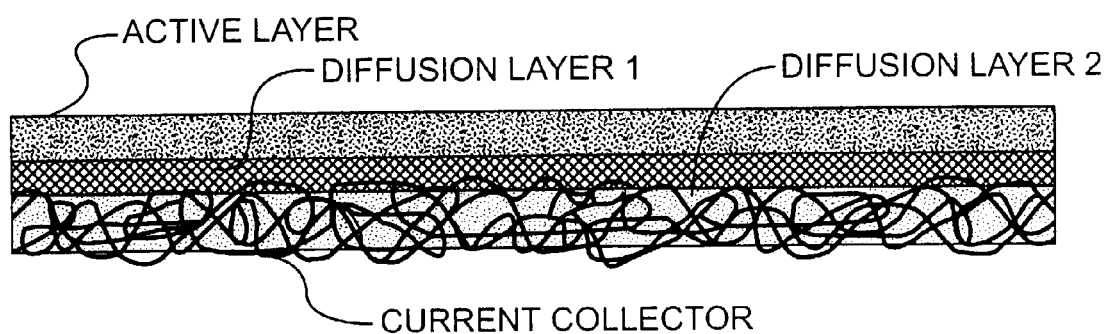
FIG. 1 is a schematic view of a porous electrode.

Fuel cell electrodes have been designed which comprise a non-woven network of conductive fibers (like carbon fleece, nickel foam sheet or stainless steel wool layer), plus additional activated carbon material, carrying one or more catalyst components and at least one polymeric substance as binder and/or repellancy agent to establish three zone interfaces (liquid-solid-liquid) or three phase interfaces (gas-liquid-solid), whereby the electroactive catalyzed material is embedded into the conductive structure by specified deposition processes (coating, blading or spraying). The specific catalyst density of the finished electrodes is within the range of 0.8 mg/cm$^3$ to 50 mg/cm$^3$ (per vol.) or 0.1 mg/cm$^2$ to 2.0 mg/cm$^2$ (per area) and the overall density of the finished electrodes is within the range of 50 mg/cm$^2$ to 150 mg/cm$^2$ (per area).

The inventive fuel cell electrodes comprise a non-woven network of conductive fibres and catalyzed active carbon material treated with one or more polymers as binders and/or surface-tension controlling agents, such hydrophobic binders (agents), including materials like polytetrafluoroethylene, fluorinated ethylene-propylene, polyethylene, polypropylene, ethylenepropylene and polyisobutenes, and hydrophilic (wetting) binders, including polysulfones and epoxy resins. The binders are selected for use in combination that assure the proper hydrophobic/hydrophilic balance of the electrode, which provides the optimum ionic conduction pathway in the electrode.

Fuel cell electrodes according to the invention may comprise a non-woven network conductive fibres and catalyzed active carbon material, whereby the carbon material is steam- or $CO_2$ activated Vulcan XC-72, or a mix with carbon black or graphite and the catalysts are selected a) For anodes from specified noble metal catalysts or mixtures in the range of 0.1–1.2 mg/cm$^2$ b) For oxygen or air cathodes with a noble metal catalyst in the same range and/or non-noble metal catalysts (like spinels, perovskites or Co-porphyrines) in specified ratios.

By the term catalyst is meant a material that promotes or enhances the rate of the reaction of interest but remains unaltered by the reaction. The catalyst component or components selected will depend on the application for which the electrodes are being used. These may be, for example, a precious metal or a transition metal as the metal or metal oxide, either unsupported or supported in a dispersed form on a carbon support; a carbon or an organic complex, in the form of a high surface area finely divided powder or fiber, or a combination of these options.

The polymeric substances act as a binder to hold the electrode layer together. Depending on the polymeric substance used it may also act to provide essential electrode structural properties, such as control of the hydrophobic/hydrophilic balance. Examples of such polymers include polytetrafluoroethylene (PTFE), fluorinated ethylene-propylene (FEP), polyethylene, polypropylene, ethylene-propylene. Such polymers are produced for example by E.I. DuPont de Nemours, they are also available in suspensions, making it possible to impregnate porous electrodes.

A first embodiment of the present invention provides electrodes as hereinbefore described wherein the catalyst component is one or more metals or their oxides in the form of finely divided unsupported powders or as metals in a dispersed form on a carbon support. Suitably the one or more metals may be a precious metal (Pt, Pd, Ru, Rh, Ir, Os, Au and Ag) or a transition metal selected from groups IVB, VB, VIB, VIIB, VIII, IB or IIB of the Periodic Table in "Handbook of Chemistry and Physics", 64th Edition, CRC Press, or a combination or alloy thereof. Preferably, one of the metals is a precious metal like Pt or an alloy thereof.

A second embodiment of the invention provides electrodes as hereinbefore described wherein a catalyst component is a selected carbon type.

A major advantage of the present invention is that a dimensionally stable and highly flexible porous electrode is obtained. The incidence of damage to the electrode on handling during manufacture is therefore minimized thus reducing the number of faulty or rejected electrodes, and consequently the cost is reduced. Furthermore, the intrinsic material cost is significantly reduced over carbon paper or woven cloths. In addition, the electrode of the invention is more amenable to high volume continuous production processes due to its high dimensional stability.

Another advantage of cells fitted with the porous electrodes is their capability to be used not only in continuous mode but also wherever intermediate operation of the cell is necessary. As the cells perform well from −10° C. to +80° C., a startup at ambient temperature is always possible. If the cell construction allows the liquid alkaline electrolyte to leave the cell after being shut down, the overall lifetime of the electrodes gets much higher because corrosion occurs mainly when the cell is left at open circuit without load. If the electrolyte is removed when the cell is not in use, only the hours of operation are counted. The predicted operation time of an alkaline fuel cell electrode is approx. 4000 hours.

A further advantage of the porous electrodes of the present invention is improved performance due to reduced mass transport losses. During operation of an alkaline fuel cell, product water is produced at the anode. This has to be efficiently removed from the electrode structure so that it does not build up in the structure and impede further diffusion (mass transport) to the reaction sites. With conventional electrodes this is not possible to fully achieve, and it becomes difficult to operate the cell efficiently at higher current densities, which is a desirable goal to improve power density. Porous electrodes of the present invention are suitable for low cost manufacture. The electrodes may be manufactured by one of two general methods.

The electrodes may be manufactured by taking a preformed nickel foam material and applying the catalyst layers comprising the catalyst on carbon and polymeric materials. This can be done by any number of coating processes such as printing, rolling, K-bar or doctor blade methods or spraying.

A second method for the manufacture of the electrode of the present invention and which provides a further aspect of the present invention, comprises mixing the carbon with at least one catalyst component or a polymeric substance and thereafter forming the porous electrode by adapting a continuous manufacturing process, for example paper-making, calendering or extrusion. For example, in a process based on paper-making technology, the materials are dispersed in a liquid carrier with at least one catalyst component and a polymeric substance to form a dilute slurry and thereafter forming a continuous structure by the controlled deposition of said slurry onto a moving mesh bed, de-watering of the solids and drying and compaction of the nickel foam containing the layers under a suitable time-pressure and temperature regime.

The paint spraying method is another major advantage because a porous electrode is easily manufactured in a fewer number of steps using continuous manufacturing techniques, thus making it more cost effective and commercially viable. For example, the liquid, carbon and binder containing suspensions can be sprayed on a previously prepared layer of the electrode. Another example is the catalyzation of a finished electrode by spraying solutions of i.e. noble metal salts on a electrode surface.

An additional advantage to be gained from this fabrication method is that the incorporation of polymeric materials into the structure can be carefully controlled, unlike coatings applied to conventional materials such as carbon fiber paper and cloth where the applied polymer will coat all available surfaces. This gives the ability to tailor the hydrophobic/hydrophilic nature of the matrix to give improved performance characteristics. The incorporation of the polymers into the structure is also easily facilitated, as is the incorporation of thermoplastic polymer materials for hot forming the electrodes into specific shapes.

The structure of the present invention is not necessarily limited to electrodes but may also be useful in structures where a robust catalyst-containing porous structure is required for such purposes as gas recombination in sealed batteries (to prevent pressure build up from the electrolysis of the electrolyte) and oxygen scavenging of enclosed systems that require the removal of oxygen to very low levels using the reaction with hydrogen.

The materials of the invention can be employed as either the anode or cathode, and indeed both anode and cathode in the electrochemical cells of the specific application.

Catalyst can be supported on Cabot VULCAN carbon black XC-72R (from Johnson Matthey Inc, New Jersey, U.S.A.) at an electrode platinum loading of preferably 0.3 mg/cm$^2$ to 1.0 mg/cm$^2$ of electrode geometric area.

The invention is further described in the following non-limiting examples.

EXAMPLES

The performance of the fuel cell electrodes were assessed by measuring the resistance free voltage (versus zinc as reference) and current density relationship in a half cell measuring unit using a standard operating procedure. Unless otherwise stated, these conditions were typically ambient temperature of the reactant gas inlet at a micropressure of anode or cathode reactant gas, and a reactant stoichiometry of 1.5 to 2.5 for hydrogen and 2.0 to 3.0 for air.

Example 1

100 g of Cabot Vulcan XC-72 was suspended in 850 mL of 15% isopropanole (in demineralized water) using a vibration mixer. 55 mL of a solution containing 0.10 mol/L Al-nitrate and 0.05 mol/L Co-nitrate was added and mixed for three minutes. The suspension was dried over night at 150° C. Then, the carbon black was milled in a high speed mixer and activated at 950° C. in a small rotating tube furnace in 2Lmin$^{-1}$ 1 $CO_2$-flow, medium residence time 45 min. This procedure was necessary to create a stable surface of the carbon.

1.00 g Dihydrogenhexachloroplatinate(II)-hexahydrate ($H_2[PtCl_6].6H_2O$) was dissolved in 100 mL demineralized water and heated to 60° C. in a water bath and stirred magnetically. 4 mL of 30% hydrogenperoxide ($H_2O_2$) was added. 20 mL of a fresh made 60 g/L solution of sodium-dithionite ($Na_2S_2O_4$) was added over a period of 15 minutes. After another 10 minutes a suspension of 2.3 g activated Vulcan XC-72 in 250 mL demineralized water was added slowly, the water bath was removed and the black suspension was stirred over night. After filtration and washing of the carbon with distilled water, the now active carbon black was dried at 70° C.

10.0 g of Shawinigan Black (from Chevron Chemicals, USA) and 10.0 g polytetrafluoroethylene (TF 9207 Hostaflon from Dyneon GmbH, Germany) were milled five minutes in an high speed mixer. Then, the mixture was suspended in 400 mL of toluene at ambient temperature for 30 minutes stirring magnetically. The suspension was filtered and the "dough" was kneaded three times through a small pasta machine. The wet dough was filled into a bottle which could be closed tight (L1).

12.0 g of Shawinigan Black and 8.0 g polytetrafluoroethylene TF 9207 were treated the same way as described above to form a second dough (L2).

16.0 g of spinel containing activated Vulcan XC-72 and 4.0 g of polytetrafluoroethylene TF 9207 were treated the same way as described above to form a third dough (L3).

A 11 cm×11 cm piece of nickel foam (511 g/m$^2$; 1.7 mm thick; from Retec, USA) was washed in Acetone and dried at 70° C. for 15 mm. To 100 mL of polytetrafluoroethylene suspension (TF 5032 Hostaflon from Dyneon GmbH, Germany) 1000 mL of demineralized water was added and stirred carefully. The dried nickel foam was put into the bath and evaporated two times to fill the pores of the foam. The foam was shaken out and dried at 120° C. for one hour. Finally, the foam was pressed at 50 kpcm$^{-2}$.

A small conical pile of dough L1 was put on the center of a piece of baking paper and covered with another piece of baking paper. Now, a roll (weight: approx. 200 kg, diameter: 25 cm) was pulled forwards and backwards at 2.8 mm using distant plates. The paper was rotated 90 degrees and it was rolled again. This was repeated three times. Then, the distant plates were changed (1.6 mm) and the rolling procedure was repeated. After rolling that way at different distances (1.2 mm, 0.8 mm, 0.6 mm, 0.4 mm) the top paper was removed and the nickel foam was put on top of the flat dough and rolled into it (0.4 mm) using the baking paper as described above.

The dough L2 was rolled the same way as described above down to a final thickness of 0.4 mm. The dough L3 was rolled the same way as described above down to a final thickness of 0.6 mm.

The rolled dough L1 was now put carbon side down on the rolled dough L2, this assembly was now rolled again (0.6 mm). The rolled dough L1+L2 was now put carbon side down on the rolled dough L3, this assembly was now rolled again (1.0 mm). The balling papers were now replaced by two sheets of filtering paper and the wet electrode was pressed at 260 kpcm$^{-2}$ at ambient temperature for 60 seconds. After removing all paper the electrode was dried at room temperature over night.

Finally, the electrode was put between two pieces of unrumpled aluminum foil and two pieces of steel (weight of each approx. 2 kg) and was heated at 380° C. for three hours (exclusive heating time: approx. 30 minutes) under nitrogen.

Figure 2:
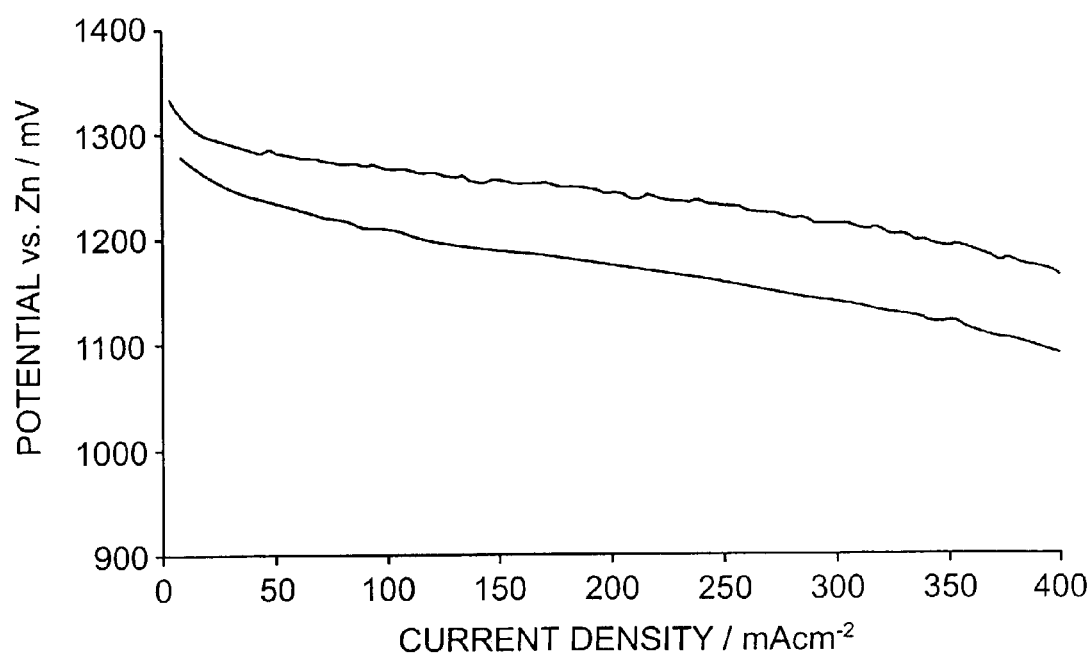
FIG. 2 shows cathodic potential (versus zinc) versus current density relating to Example 1.

The precatalysation step of the electrode manufacture led to very small and therefore highly active Pt-particles (smaller than 5 nm). Second, a final catalysation step is not necessary. This electrode gives a fine cathode as shown in FIG. 2.

Example 2

100 g of Cabot Vulcan XC-72 was milled in a high speed mixer and activated at 950° C. in a small rotating tube furnace in 2 Lmin$^{-1}$ $CO_2$-flow, medium residence time 45 min. This procedure was necessary to create a stable surface of the carbon.

A 11 cm×11 cm piece of nickel foam (511 g/m$^2$; 1.7 mm thick; from Retec, USA) was treated the same way as described in example 1.

12.0 g of Shawinigan Black (from Chevron Chemicals, USA), 5.6 g polyethylene (S-379N from Shamrock, USA) and 2.0 g polytetrafluoroethylene (TF 9207 Hostaflon from Dyneon GmbH, Germany) were milled five minutes in an high speed mixer. Then, the mixture was suspended in 600 mL of toluene containing 0.4 g of solved polyisobutene (Oppanol®, from BASF, Germany) at ambient temperature for 30 minutes stirring magnetically. The suspension was filtered and the "dough" was kneaded three times through a small pasta machine. The wet dough was filled into a bottle which could be closed tight (L1 and L2).

17.0 g of activated Vulcan XC-72, 2.0 g polyethylene (S-379N) and 0.6 g polytetrafluoroethylene (TF 9207) were treated the same way as described above to form a second dough (L3).

The dough L1 was rolled the same way as described in example 1 down to a final thickness of 0.4 mm (including the nickel foam). This step is necessary to fill the foam. The dough L2 was rolled the same way as described in example 1 down to a final thickness of 0.4 mm. This step is necessary to prepare a layer of proper thickness. The dough L3 was rolled the same way as described in example 1 down to a final thickness of 0.6 mm.

The dough L2 was rolled onto dough L3 at 0.8 mm as described in example 1. The rolled dough L1 was now put carbon side down on the L2-side of the rolled dough L2+L3, this assembly was now rolled again (1.0 mm and 0.8 mm). The baking papers were now replaced by two sheets of filtering paper and the wet electrode was pressed at 170 kpcm$^{-2}$ at ambient temperature for 60 seconds. After removing all paper the electrode was dried at room temperature for one hour and at 110° C. for another hour.

Finally, a fresh made noble metal solution (0.97 mL chloridic 100 mg/mL $Pd^{2+}$ solution in demineralized water +0.24 mL chloridic 100 mg/mL $Pt^{2+}$ solution in demineralized water +1.79 mL demineralized water +2.00 mL isopropanole) was sprayed onto the surface of the electrode using an computer controlled automatic spraying device, comparable to an automatic airbrush. The catalyst was activated at 110° C. for three hours.

Figure 3:
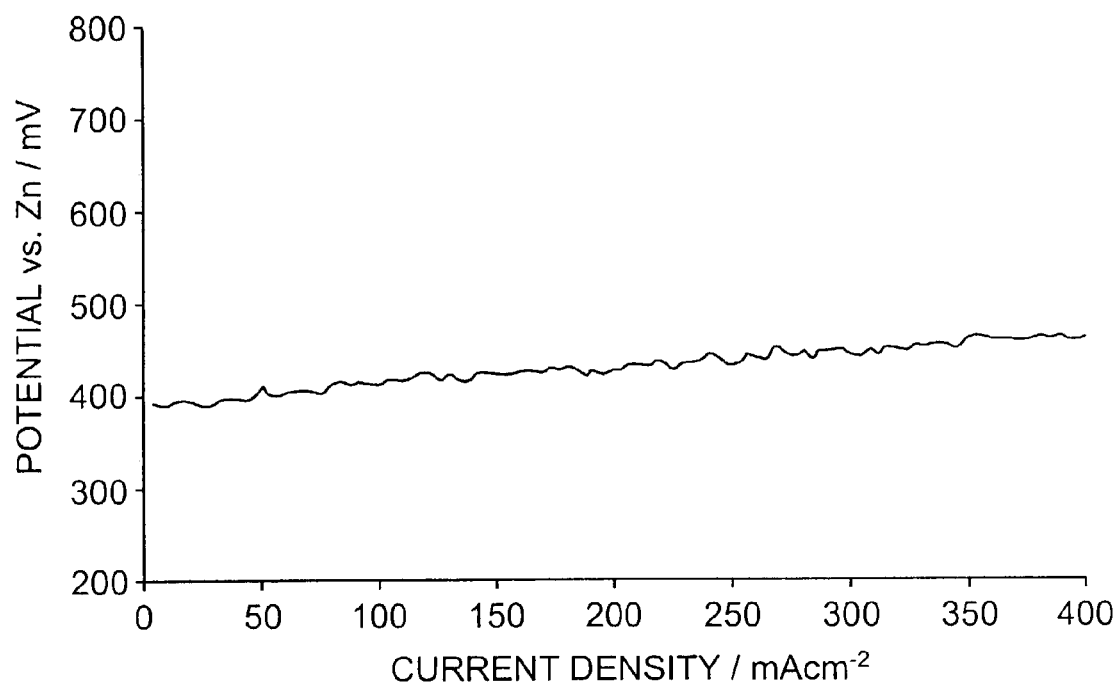
FIG. 3 shows anodic potential (versus zinc) versus current density relating to Example 2.

This electrode gives a flexible electrode because of the polyisobutene, which behaves like rubber. The low cost electrode prepared this way works fine as anode, see FIG. 3.

Example 3

100 g of Cabot Vulcan XC-72 was treated the same way as described in example 1.

A 11 cm×11 cm piece of nickel foam (511 g/m$^2$; 1.7 mm thick; from Retec, USA) was treated the same way as described in example 1.

14.0 g of Shawinigan Black (from Chevron Chemicals, USA) and 5.6 g polyethylene (S-379N from Shamrock, USA) were milled five minutes in an high speed mixer. Then, the mixture was suspended in 600 mL of toluene containing 0.4 g of solved polyisobutene (Oppanol®, from BASF, Germany) at ambient temperature for 30 minutes stirring magnetically. The suspension was filtered and the "dough" was kneaded three times through a small pasta machine. The wet dough was filled into a bottle which could be closed tight (L1 and L2).

17.6 g of activated Vulcan XC-72 and 1.0 g polyethylene (S-379N) were treated the same way as described above to form a second dough (L3).

The layers L1, L2 and L3 were formed exactly the same way as described in example 2.

After pressing the electrode (60 sec, 170 kpcm$^{-2}$) at ambient temperature between two sheets of filtering paper, the electrode was dried at room temperature for one hour and at 110° C. for another hour.

This electrode is more hydrophilic than the electrodes described in example 1 and example 2 and can therefore be used in direct methanol fuel cells.

While the invention has been described above with respect to certain embodiments thereof, it will be appreciated by one of skill in the art that variations and modifications may be made without departing from the spirit and scope of the invention.

Figure 4:
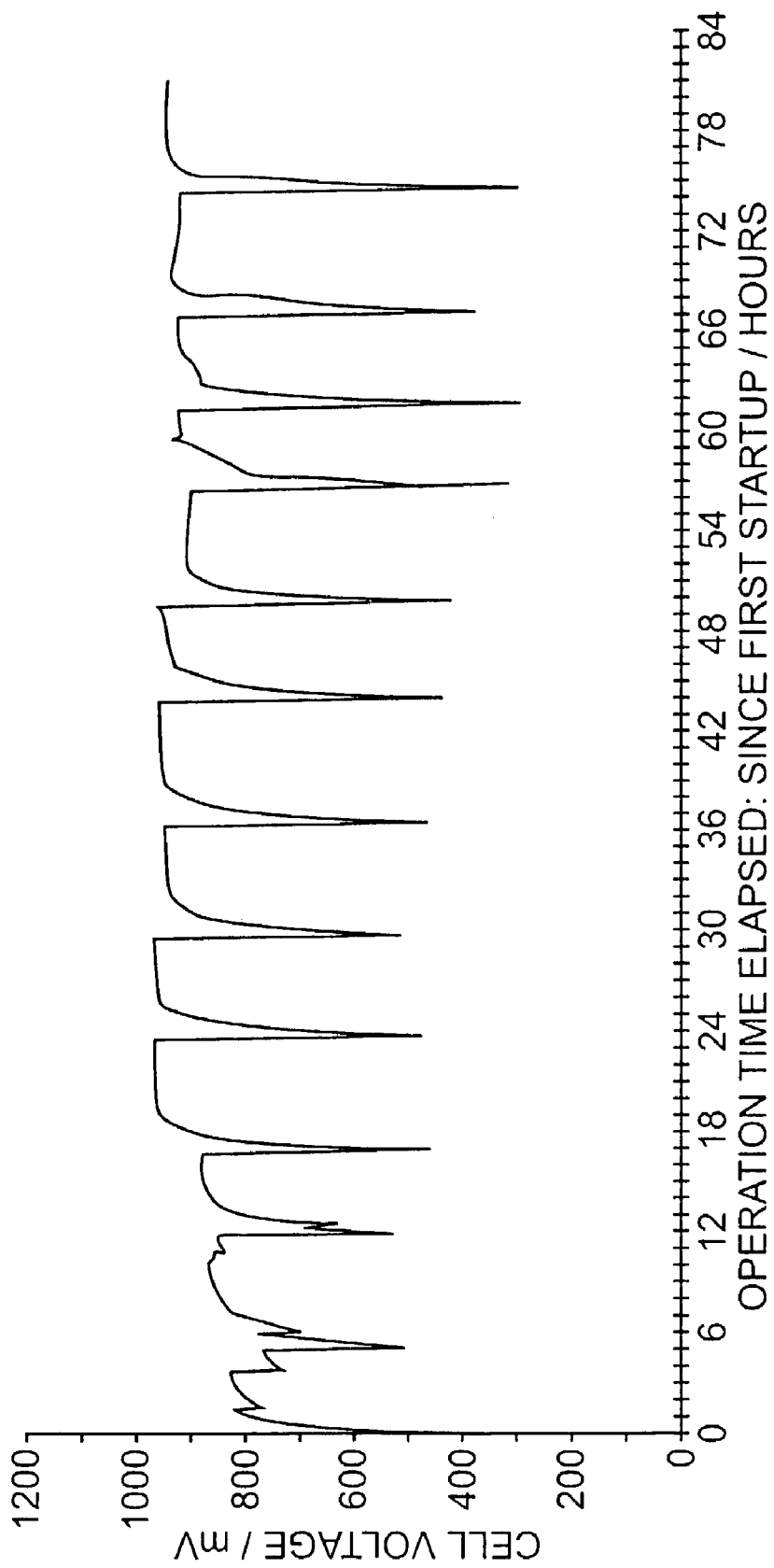
FIG. 4 shows cell voltage versus time plot of a cell at intermediate operation mode. At each stop, the electrolyte was removed, wherein duration of the stops were 10 to 80 hours.

Fuel cells manufactured according to the invention are suitable for use in cells running in continuous operation mode as well as intermediate operation mode. The preferred mode is the intermediate mode, as this mode improves the electrical properties of the electrodes. A tracing from intermediate operation of a hydrogen-air cell is set forth in FIG. 4.

What is claimed is:

1. A fuel cell electrode comprising:
    a non-woven network of conductive fibers, electroactive carbon material carrying one or more catalysts, and at least one polymeric substance selected from the group consisting of a binder and a repellancy agent to establish liquid-solid-liquid zone interface or gas-liquid-solid phase interface,
    whereby structure of the electrode is formed upon embedding electroactive carbon material into the network of conductive fibers by a deposition process selected from the group consisting of coating, blading and spraying, and
    whereby specific catalyst density of the electrode is within the range of 0.8 mg/cm$^3$ to 50 mg/cm$^3$ (per vol.) or 0.1 mg/cm$^2$ to 2.0 mg/cm$^2$ (per area) and overall density of the electrode is within the range of 50 mg/cm$^2$ to 150 mg/cm$^2$ (per area),
    wherein the conductive fibers are selected from the group consisting of a carbon fleece, nickel and stainless steel, and wherein the nickel conductive fibers comprise a nickel foam sheet and the stainless steel conductive fibers comprise stainless steel wool.

2. The fuel cell electrode as claimed in claim 1, wherein the catalyzed electroactive carbon material is treated with one or more polymeric binders, the polymeric binders being selected to provide a suitable hydrophobic/hydrophilic balance to the electrode, creating an optimum ionic conduction pathway in the electrode.

3. The fuel cell electrode as claimed in claim 2, wherein the polymeric binders are selected from the group consisting of polytetrafluoroethylene, fluorinated ethylene-propylene copolymers, polyethylene, polypropylene, ethylene-propylene copolymers, polyisobutenes, polysulfones and epoxy resins.

4. The fuel cell electrode as claimed in claim 1, wherein the electroactive carbon material is steam-activated or $CO_2$-activated acetylene carbon black, or a mix with carbon black or graphite, and the one or more catalysts are selected:

a) from one or more noble metal catalysts in the range of 0.1–1.2 mg/cm$^2$ for anodes; and b) from the group consisting of a noble metal catalyst in the range of 0.1–1.2 mg/cm$^2$, a non-noble metal catalyst, and mixtures thereof for oxygen or air cathodes, wherein the non-noble metal catalyst is selected from the group consisting of spinels, perovskites and Co-porphyrines.

5. The fuel cell electrode as claimed in claim 4, wherein the electroactive carbon material is steam-activated or $CO_2$ activated carbon, and 0.2 to 3.0 mass % of a spinel $AB_2O_4$ is added to the carbon material to hasten carbon activation and to further stabilize the catalyst, wherein A=Mn, Co, Ni, Cu, or Cd, and B=Al, V, Cr, Ti.

6. The fuel cell electrode as claimed in claim 5, wherein the electrode is manufactured by filling a conductive metal fiber or carbon fleece structure with the electroactive carbon material by a) doctor blading of a highly viscous mixture achieved by adding the catalyst-containing electroactive carbon material to a suspension of polymer binder or adding the electroactive carbon material without a catalyst to a suspension of polymer binder and post-catalyzing the electrode;

b) spraying a low viscosity mixture; and c) rolling, pressing, or rolling and pressing the electrodes to a predetermined electrode thickness, at a predetermined temperature.

7. The fuel cell electrode as claimed in claim 1, wherein multiple electrodes comprise stacks of various lengths adjusted to provide a predetermined voltage, wherein individual cells comprise either:

a) edge-collecting terminals; or b) bipolar plates forming bipolar assemblies.

8. The fuel cell electrode as claimed in claim 7, wherein the fuel cell electrodes comprising cells having edge collecting terminals further comprise fuel channels and oxygen manifolds arranged in pairs.

9. The fuel cell electrode as claimed in claim 7, wherein the fuel cell electrodes comprising cells having bipolar assemblies comprise bipolar plates formed from molded conductive plastic or corrugated metal plates.

10. A fuel cell electrode comprising:

a non-woven network of conductive fibers, electroactive carbon material carrying one or more catalysts, and at least one polymeric substance selected from the group consisting of a binder and a repellancy agent to establish liquid-solid-liquid zone interfaces or gas-liquid-solid phase interfaces, whereby structure of the electrode is formed upon embedding electroactive carbon material into the network of conductive fibers by a deposition process selected from the group consisting of coating, blading and spraying, and whereby specific catalyst density of the electrode is within the range of 0.8 mg/cm$^3$ to 50 mg/cm$^3$ (per vol.) or 0.1 mg/cm$^2$ to 2.0 mg/cm$^2$ (per area) and overall density of the electrode is within the range of 50 mg/cm$^2$ to 150 mg/cm$^2$ (per area), wherein the conductive fibers are selected from the group consisting of a carbon fleece, nickel and stainless steel, and wherein the non-woven network of nickel or stainless steel conductive fibers is partly coated by at least one polymeric substance selected from the group consisting of polytetrafluoroethylene, fluorinated ethylene-propylene copolymers, polyethylene, polypropylene, ethylene-propylene copolymers and polyisobutenes, thereby conferring hydrophobicity to the nickel or stainless steel while still supporting electrical surface conductivity.

\* \* \* \* \*